(12) United States Patent  
Yanagi et al.

(10) Patent No.: US 7,956,798 B2  
(45) Date of Patent: Jun. 7, 2011

(54) RADAR APPARATUS AND RADAR PICTURE DISPLAY METHOD

(75) Inventors: Katsuyuki Yanagi, Nishinomiya (JP); Koji Dai, Nishinomiya (JP); Sae Takemoto, Nishinomiya (JP)

(73) Assignee: Furuno Electric Company, Ltd, Nishinomiya (JP)

( * ) Notice: Subject to any disclaimer, the term of this patent is extended or adjusted under 35 U.S.C. 154(b) by 129 days.

(21) Appl. No.: 11/811,725

(22) Filed: Jun. 12, 2007

(65) Prior Publication Data

US 2008/0100503 A1     May 1, 2008

(30) Foreign Application Priority Data

Jun. 13, 2006   (JP) ................. 2006-163914

(51) Int. Cl.
*G01S 7/12* (2006.01)
*G01S 13/66* (2006.01)
*G01S 13/10* (2006.01)

(52) U.S. Cl. .............. 342/176; 342/41; 342/137
(58) Field of Classification Search .............. 342/137, 342/176–186, 195, 41, 61–72, 131–132, 342/134–144, 201–204
See application file for complete search history.

(56) References Cited

U.S. PATENT DOCUMENTS

| | | | |
|---|---|---|---|
| 3,955,196 A * | 5/1976 | Nirasawa et al. | 342/159 |
| 4,136,341 A | 1/1979 | Mulder et al. | |
| 4,626,855 A * | 12/1986 | Rouse | 342/201 |
| 5,140,332 A | 8/1992 | Martin et al. | |
| 6,771,205 B1 * | 8/2004 | Barton et al. | 342/13 |
| 7,016,772 B2 * | 3/2006 | Yanagi | 701/21 |
| 2007/0035439 A1 * | 2/2007 | Michel | 342/41 |

FOREIGN PATENT DOCUMENTS

| | | |
|---|---|---|
| EP | 0 389 720 | 10/1990 |
| GB | 2 085 251 | 4/1982 |
| JP | 04-098179 | 3/1992 |
| JP | 2000-206225 | 7/2000 |
| WO | WO-2006/123084 | 11/2006 |

OTHER PUBLICATIONS

A study of optimal target's position in ARPA system Murai, K.; Hayashi, Y.; Inokuchi, S.; Takaoka, S.; Position Location and Navigation Symposium, 2002 IEEE Apr. 15-18, 2002 pp. 142-149.*
U.S. Appl. No. 11/789,778, filed Apr. 25, 2007.

* cited by examiner

*Primary Examiner* — Thomas H Tarcza
*Assistant Examiner* — Cassi Galt
(74) *Attorney, Agent, or Firm* — Nutter McClennen & Fish LLP; John J. Penny, Jr.; Christina M. Sperry

(57) ABSTRACT

A radar apparatus having an integral ARPA function transmits at least two kinds of pulse signals, each of which has different pulselength, according to a specific transmission pattern and receives echoes of the transmitted pulse signal. The radar apparatus includes an echo data generator for generating display echo data for each range scale selected for on-screen presentation by using an echo signal obtained with each transmission pulselength, an ARPA processor for generating a single set of motion-related information on each tracked target to be superimposed on the display echo data by using echo signals obtained with the different pulselengths, a display output synthesizer for superimposing the motion-related information on each tracked target generated by the ARPA processor on the display echo data, and a display unit for displaying a superimposed picture produced by the display output synthesizer.

7 Claims, 7 Drawing Sheets

DISPLAY PICTURE OF RANGE R0

DISPLAY PICTURE OF RANGE R1

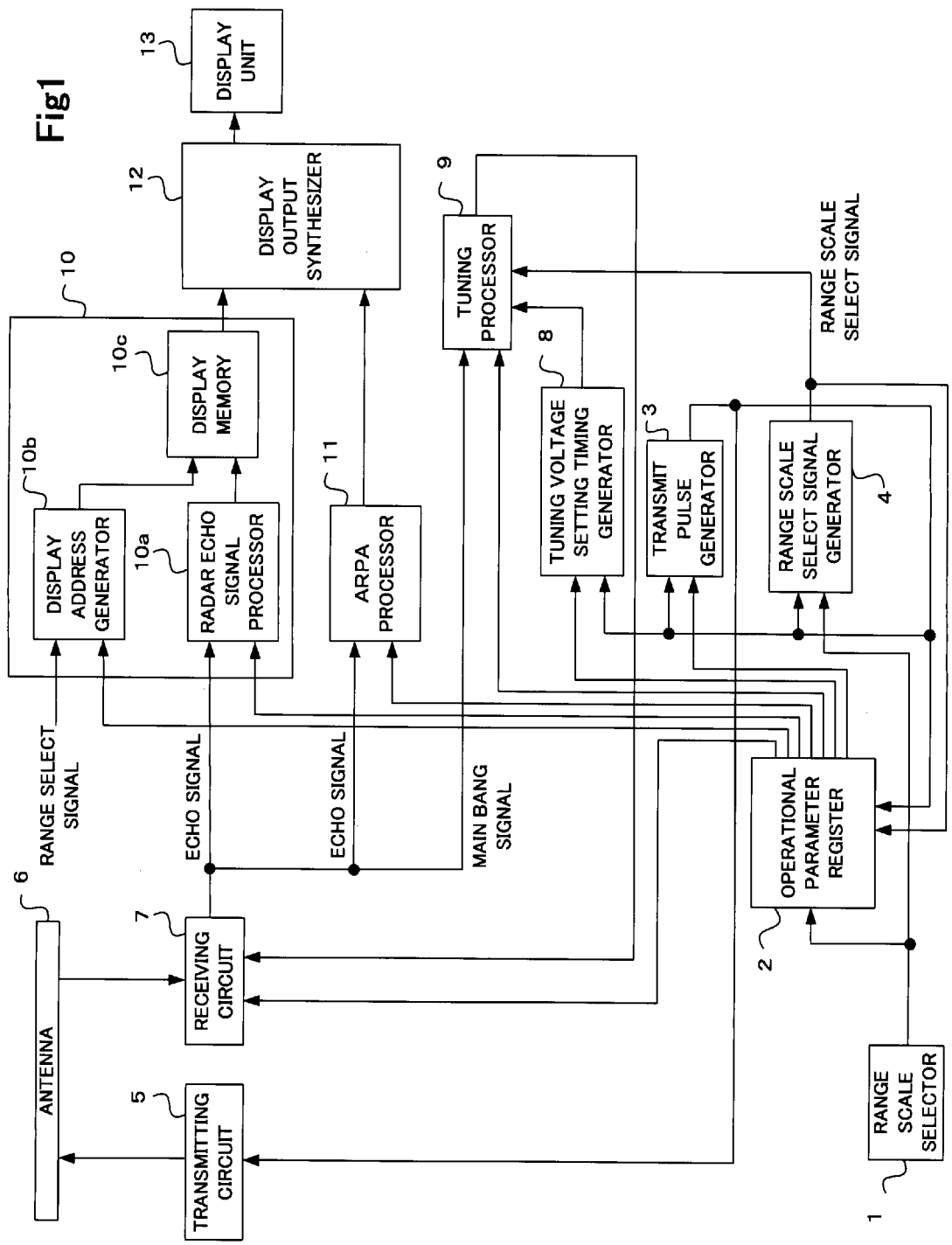

INFORMATION ON TRACKED TARGETS
OBTAINED WITH PULSELENGTH S

INFORMATION ON TRACKED TARGETS
OBTAINED WITH PULSELENGTH L

INFORMATION ON TRACKED TARGETS
SUPERIMPOSED ON DISPLAY ECHO DATA

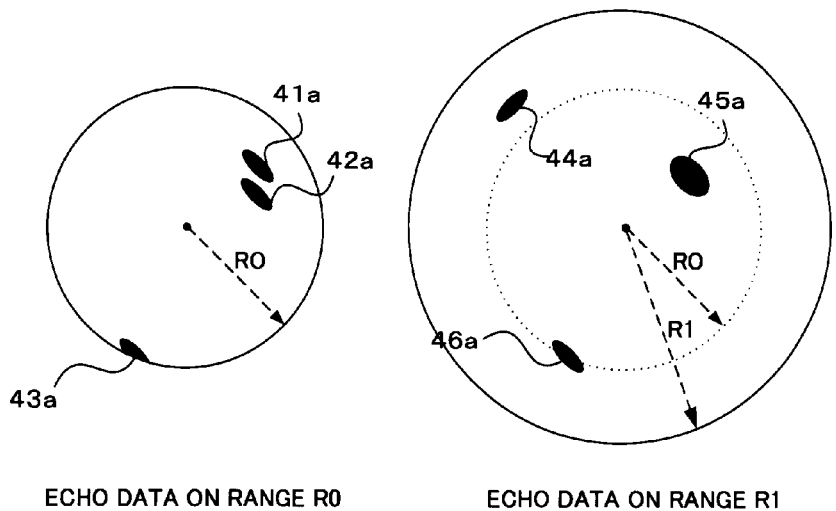
ECHO DATA ON RANGE R0    ECHO DATA ON RANGE R1
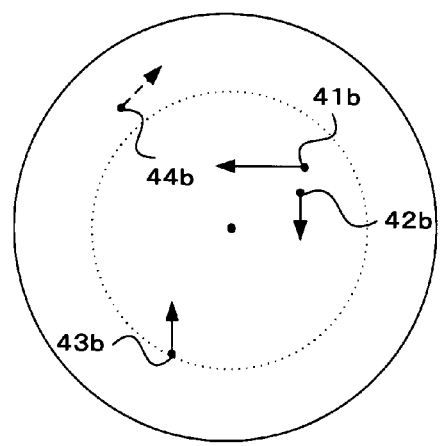
INFORMATION ON TRACKED TARGETS
SUPERIMPOSED ON DISPLAY ECHO DATA
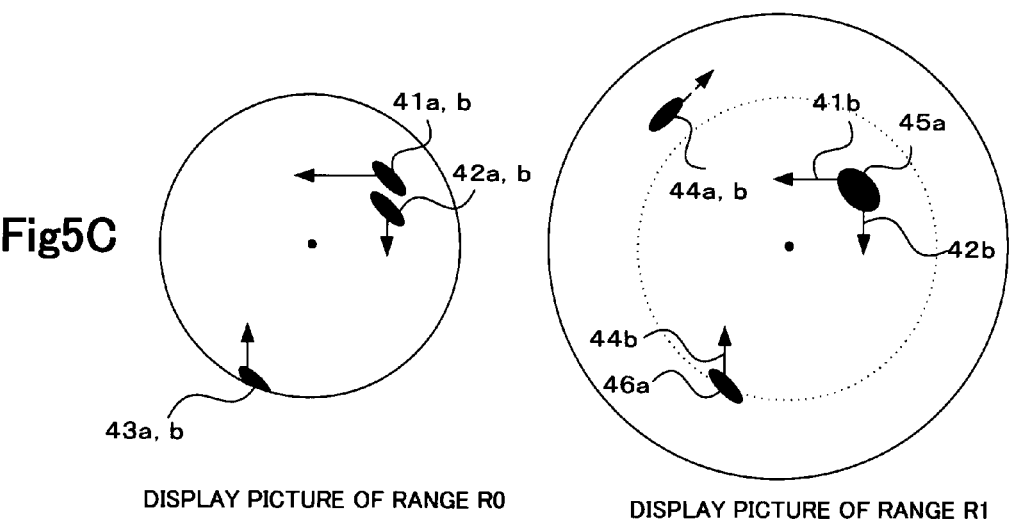
DISPLAY PICTURE OF RANGE R0    DISPLAY PICTURE OF RANGE R1

SCOPE OF SHORT PULSELENGTH S

SCOPE OF LONG PULSELENGTH L

RADAR APPARATUS AND RADAR PICTURE DISPLAY METHOD

CROSS REFERENCE OF RELATED APPLICATION

Japanese Patent Application Tokugan No 2006-163914 is hereby incorporated by reference.

BACKGROUND OF THE INVENTION

1. Field of the Invention

The present invention relates generally to a radar apparatus and, more particularly, to an Automatic Radar Plotting Aid (ARPA) configured based on a radar apparatus which transmits and receives signals having different pulselengths assigned individually to plural range scales in use through a single antenna.

2. Description of the Related Art

A radar apparatus conventionally used on a ship, for instance, transmits a specific pulse signal and receives an echo signal reflected by surrounding targets through an antenna. The radar apparatus determines angular direction, or bearing ($\theta$), of a particular target from the direction of the antenna as well as a range (r) to the target based on the time elapsed from transmission of the pulse signal to reception of the echo signal.

The pulse signal transmitted from the antenna has a pulselength which is determined in accordance with a detection range and range discrimination that are required. Typically, the pulselength is determined for each range scale selected for on-screen presentation. For example, a short pulselength is selected to achieve higher range discrimination on a short range scale as echoes received from nearby targets are generally strong, whereas a long pulselength is selected to receive a larger amount of information and thereby achieve improved target detectability on a long range scale as echoes from far targets weaken.

If the transmission pulselength is lengthened to improve long-range target detectability, however, the range discrimination deteriorates. Thus, there arises a problem that nearby targets can not be discriminated from one another when these targets are observed on a long range scale. The conventional radar apparatus exhibits this drawback most conspicuously particularly when viewing nearby targets on a long range scale. For this reason, it has been necessary for a radar observer to switch the radar apparatus to an optimum range scale depending on the distance between own ship and targets of interest.

Although some radar apparatuses offer a "zoom" function which is conventional, the zoom function simply displays an enlarged picture obtained by "zooming in" part of the echo signal received on the range scale in use and, thus, the enlarged part of the echo signal is not displayed with increased range discrimination. Therefore, the zoom function does not provide any solution to the aforementioned drawback of the conventional radar apparatus.

Japanese Patent Application Publication No. 1992-98179 and Japanese Patent No. 3507717 each disclose a technique which enables a radar apparatus to transmit signals having different pulselengths assigned individually to two or more range scales according to a selected transmit pulse sequence and simultaneously display radar pictures on two or more range scales on a display unit. This technique, if implemented in a radar apparatus, makes it possible to simultaneously present echo signals obtained with multiple pulselengths on different range scales with high target detectability.

Today, radars provided with an ARPA function are widely used onboard ships to aid in preventing a collision with a target ship or other objects.

An ARPA acquires user-selected and/or automatically selected targets, automatically tracks the acquired targets and calculates such motion-related information as course and speed of each tracked target by mathematically processing target data obtained by digitizing radar echo signals detected from a specific detection area. The ARPA presents the motion-related information on the targets in an easy-to-understand manner and, when a dangerous situation occurs, generates a signal to warn an observer of that situation.

The aforementioned technique of Japanese Patent Application Publication No. 1992-98179 and Japanese Patent No. 3507717, if implemented in an ARPA, poses a problem that the result of acquisition and tracking of the same target would differ depending on which one of the multiple pulselengths is used. This is because echoes of two nearby targets which are separated from each other on a short pulselength can merge into a single target echo when the ARPA is switched to a long pulselength which results in a poor range discrimination.

Especially when the ARPA is operated in a mode in which multiple radar pictures obtained with different pulselengths are simultaneously displayed on a single screen, the ARPA function will provide different results for the targets detected with the short pulselength and the targets detected with the long pulselength, thereby causing confusion to the user.

SUMMARY OF THE INVENTION

In light of the aforementioned problems of the prior art, it is an object of the invention to provide a correct on-screen presentation of motion-related information on each tracked target. It is another object of the invention to provide a radar apparatus having an integral ARPA function and a radar picture display method which make it possible to present the same motion-related information on each tracked target on all range scales in use without ARPA tracking errors even when the radar apparatus is operated in a mode in which multiple radar pictures obtained with different transmission pulselengths are simultaneously displayed on a single screen.

To provide a solution to the aforementioned problems of the prior art, a radar apparatus in one aspect of the invention capable of transmitting at least two kinds of pulse signals, each of which has a different pulselength, and for receiving echoes of the transmitted pulse signal through a single antenna includes a transmitter for generating the pulse signal having at least the two different pulselengths according to a specific transmission pattern, a receiver for receiving the aforementioned echoes of the transmitted pulse signal, and an ARPA processor for generating a single set of motion-related information on each tracked target to be superimposed on display echo data by using echo signals obtained with the different pulselengths.

In another aspect of the invention, a radar apparatus for transmitting at least two kinds of pulse signals, each of which has a different pulselength, and for receiving echoes of the transmitted pulse signal through a single antenna includes a transmitter for generating the pulse signal having at least the two different pulselengths according to a specific transmission pattern, a receiver for receiving the aforementioned echoes of the transmitted pulse signal, an echo data generator for generating display echo data for each range scale selected for on-screen presentation by using an echo signal obtained with the same pulselength by the receiver, an ARPA processor for generating a single set of motion-related information on each tracked target to be superimposed on the display echo data by using echo signals obtained with the different pulselengths, a display output synthesizer for superimposing the motion-related information on each tracked target generated by the ARPA processor on the display echo data, and a display unit for displaying a superimposed picture produced by the display output synthesizer.

In one feature of the invention, the ARPA processor generates plural sets of motion-related information on each tracked target from the echo signals obtained with the individual pulselengths and selectively combines pieces of the motion-related information thus generated according to the distance from own ship position to produce the aforementioned motion-related information on each tracked target to be superimposed on the display echo data.

In another feature of the invention, the ARPA processor selects one of the echo signals obtained with the different pulselengths according to the distance from own ship position and produces the aforementioned motion-related information on each tracked target to be superimposed on the display echo data by using the selected echo signal. Since the ARPA processor selectively processes the echo signals obtained with the different pulselengths in this way, it is possible to reduce computational complexity by approximately half compared to a case where the ARPA processor generates plural sets of motion-related information on each tracked target from the echo signals obtained with the individual pulselengths.

When generating the motion-related information on each tracked target to be superimposed on the display echo data, it is preferable to give priority to such pieces of motion-related information that are derived from an echo signal obtained with a short pulselength which produces higher range discrimination for any tracked target located close to own ship.

As an example, the ARPA processor preferably produces the motion-related information on each tracked target to be superimposed on the display echo data by assigning such a piece of motion-related information that is derived from the echo signal obtained with a transmission pulselength for a shorter range scale for each target tracked in a nearby area of own ship and such a piece of motion-related information that is derived from the echo signal obtained with a transmission pulselength for a longer range scale for each target tracked in a distant area.

Alternatively, the ARPA processor preferably assignes such a piece of motion-related information that is derived from the echo signal obtained with a transmission pulselength for a shortest range scale for each target tracked within a specific range of distances from own ship.

In still another feature of the invention, the motion-related information superimposed on the display echo data may include at least one of such information as course and speed of a tracked target as well as range and bearing of the tracked target as viewed from own ship.

According to the present invention, the radar apparatus generates uniquely defined motion-related information on each tracked target to be superimposed on the display echo data on each range scale by using the echo signals obtained with different transmission pulselengths. It is therefore possible to present the same motion-related information on the same tracked target even when plural radar pictures are simultaneously displayed on different range scales.

Additionally, the ARPA processor gives priority to such pieces of motion-related information that are derived from an echo signal obtained with a short pulselength which produces higher range discrimination for any tracked targets located close to own ship, so that it is possible to provide more detailed motion-related information on the tracked targets. This is particularly advantageous in avoiding presentation of incorrect motion-related information which will result from poor range discrimination on a longer range scale due to the use of a longer transmission pulselength.

These and other objects, features and advantages of the invention will become more apparent upon a reading of the following detailed description in conjunction with the accompanying drawings.

BRIEF DESCRIPTION OF THE DRAWINGS

FIG. 1 is a block diagram showing the configuration of a radar apparatus according to a first embodiment of the invention;

FIGS. 5A, 5B and 5C are diagrams showing how a display output synthesizer of the radar apparatus of the first embodiment processes display echo data and the motion-related information;

DETAILED DESCRIPTION OF THE PREFERRED EMBODIMENTS OF THE INVENTION

Figure 2A:
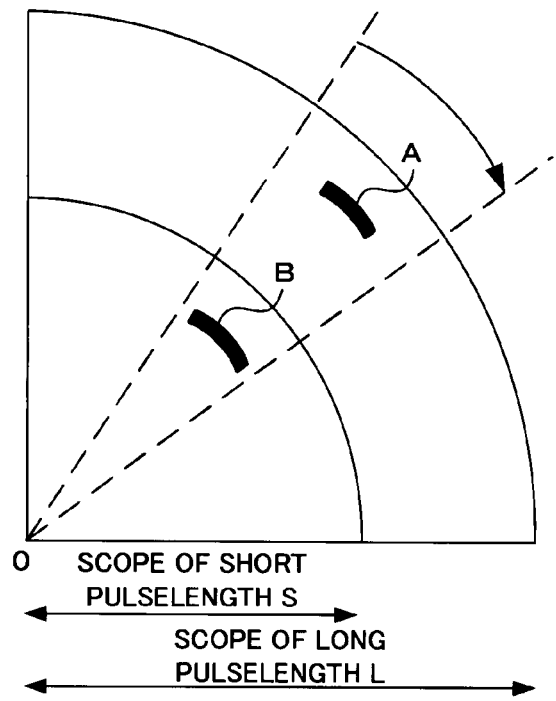
FIGS. 2A and 2B are diagrams depicting echo signals input into the an ARPA processor of the radar apparatus of the first embodiment.

The invention is now described in detail with reference to the appended drawings.

First Embodiment

FIG. 1 is a block diagram showing the configuration of a radar apparatus having an integral ARPA function according to a first embodiment of the invention. As shown in FIG. 1, the radar apparatus of the first embodiment includes a range scale selector 1, an operational parameter register 2, a transmit pulse generator 3, a range scale select signal generator 4, a transmitting circuit 5, an antenna 6, a receiving circuit 7, a tuning voltage setting timing generator 8, a tuning processor 9, an echo data generator 10, an ARPA processor 11, a display output synthesizer 12 and a display unit 13.

The range scale selector 1 determines a range scale for on-screen presentation in accordance with an operator input. If the operator intends to simultaneously present a pair of radar pictures on two different range scales, the operator selects a dual-picture display mode and the two range scales for on-screen presentation by manipulating appropriate operating controls, such as keys or knobs. The range scale selector 1 determines a combination of two range scales for on-screen presentation as selected by the operator and outputs this combination of two range scales to the operational parameter register 2. Then, the operational parameter register 2 determines transmission pulselengths suited to the two range scales selected.

The operational parameter register 2 is a register which holds specific operational parameters for individual circuits according to the pulselengths of a pulsed transmit signal and supplies the operational parameters to pertinent constituent elements of the radar apparatus according to the transmission pulselengths suited to the range scales selected by the range scale selector 1, a pulse signal output from the transmit pulse generator 3 and a range scale select signal output from the range scale select signal generator 4.

The transmit pulse generator 3 determines transmission intervals of successive pulses of the transmit signal for the selected range scales and generates waveforms of the pulses to be transmitted at the specified pulselengths based on information given by the operational parameter register 2. The operational parameter register 2 gives the pulselength of a pulse to be transmitted next and information on pulse amplitude as well as a next signal transmission timing to the transmit pulse generator 3 based on the range scale select signal fed from the range scale select signal generator 4. The transmit pulse generator 3 counts time up to the next signal transmission timing given by the operational parameter register 2. When the signal transmission timing is reached, the transmit pulse generator 3 generates a pulse signal having the specified pulselength and amplitude.

The range scale select signal generator 4 stores a predefined transmission sequence suited to each combination of range scales determined by the range scale selector 1. The range scale select signal generator 4 outputs the range scale select signal which notifies the individual constituent elements of the radar apparatus of the pulselength of a next pulse to be transmitted according to the transmission sequence for the selected combination of range scales. The expression "transmission sequence" as used in this Specification refers to information which determines an order of transmission of pulses for the individual range scales. Provided that the operator selects the dual-picture display mode to simultaneously present two radar pictures on range 0 and range 1, for example, the transmission sequence defines in what order the radar apparatus should transmit pulses on range 0 and range 1 at pulselengths suited to the respective range scales. The information provided by the transmission sequence may be such that the radar apparatus should alternately transmit pulses on range 0 and range 1, or two successive pulses on range 0 and then one pulse on range 1 in repetitive cycles, for instance.

In the radar apparatus of the first embodiment structured as illustrated in FIG. 1, the operational parameter register 2, the transmit pulse generator 3 and the range scale select signal generator 4 together determines the transmission sequence which gives a transmission pattern defining the order of transmission of pulses having different pulselengths and pulse repetition intervals. To be more specific, the order of transmission of pulses having the different pulselengths is determined according to the range scale select signal output from the range scale select signal generator 4 while the operational parameter register 2 and the transmit pulse generator 3 determine the pulse repetition intervals suited to the respective range scales on which the radar apparatus transmits the pulse signal at the different pulselengths.

The transmitting circuit 5 generates a radio signal with the same pulselengths and timing as specified by the pulse signal output from the transmit pulse generator 3 and delivers the radio signal to the antenna 6 for transmission. While the transmitting circuit 5 of this embodiment employs a magnetron as an oscillating device, the oscillating device may be a semiconductor device or other types.

The antenna 6 transmits the radio signal generated by the transmitting circuit 5 and receives an echo signal reflected by targets while rotating at a specified speed.

The receiving circuit 7 down-converts the echo signal received in successive transmit cycles into an intermediate frequency (IF) signal using a local oscillation frequency and passes the IF signal through a bandpass filter having a bandwidth suited to the pulselengths of the transmit signal. Parameters of the bandpass filter used in the receiving circuit 7 are supplied from the operational parameter register 2. A signal fed from the antenna 6 contains a main bang signal and the echo signal which are separated from each other in the receiving circuit 7. The main bang signal is delivered to the tuning processor 9 whereas the echo signal (IF signal) is delivered to the echo data generator 10 and the ARPA processor 11. It is possible to separate the echo signal and the main bang signal from each other by properly switching a selector according to time elapsed after each transmission of the pulse signal, for instance.

The tuning voltage setting timing generator 8 is means for giving a timing of switching a tuning voltage in execution of tuning operation performed by the tuning processor 9. Specifically, the tuning voltage setting timing generator 8 generates a timing of setting the tuning voltage which is set by the tuning processor 9 according to an echo signal sampling period and a time lag from the beginning of tuning voltage setting to a point in time when a desired local oscillation frequency is reached. Generally, the echo signal sampling period is determined depending on the range scale in use. Typically, received echo data is sampled for a duration of time corresponding approximately to 1.5 times the selected range scale.

In a case where a magnetron is used as the oscillating device of the transmitting circuit 5, it is necessary to take into consideration idle time of the magnetron that occurs between one transmit cycle and the next in determining transmission timing of the pulse signal. It is therefore desirable to take into consideration the idle time of the magnetron between one transmit cycle and the next when determining the transmission pattern.

The tuning processor 9 generates tuning voltages and stores the generated tuning voltages in storage means like a register. The tuning processor 9 sets the tuning voltage suited to the range scale as specified by the range scale select signal according to the tuning voltage setting timing given by the tuning voltage setting timing generator 8.

Operation performed by the tuning processor 9 for generating the tuning voltage is as follows. First, the tuning processor 9 receives the number of samples to be sampled corresponding to the current pulselength from the operational parameter register 2 and extracts the specified number of samples of main bangs, wherein the main bangs are sampled from each received signal of the same pulselength. Then, the tuning processor 9 obtains information on the current transmitting frequency from the specified number of samples of the main bangs that have been extracted and generates the tuning voltage corresponding to this frequency information. The tuning voltage thus generated is once stored in the storage means, such as a register, of the tuning processor 9. Subsequently, the tuning processor 9 outputs the tuning voltage used to generate the local oscillation frequency for tuning the receiving circuit 7 to a desired IF frequency at the tuning voltage setting timing output from the tuning voltage setting timing generator 8 for the current pulselength.

While the tuning voltage may be generated according to the frequency of the main bangs as discussed above in the present embodiment, the radar apparatus may be structured such that the operational parameter register 2 stores values of tuning voltages suited to plural pulselengths and the tuning processor 9 generates the tuning voltage according to a tuning voltage value supplied from the operational parameter register 2.

The echo data generator 10 is for generating echo data for on-screen presentation (hereinafter referred to as the display echo data) using the echo signal fed from the receiving circuit 7 for each transmission pulselength. As shown in FIG. 1, the echo data generator 10 includes a radar echo signal processor 10*a*, a display address generator 10*b* and a display memory 10*c*.

The echo data generator 10 performs such signal processing operations on the echo signal fed from the receiving circuit 7 as gain adjustment, unwanted signal rejection and resampling of the received echo data according to the selected range scale based on the operational parameters supplied from the operational parameter register 2.

The display address generator 10*b* generates a map of addresses expressed in Cartesian coordinates corresponding to coordinates in a polar coordinate system (of which starting address corresponds to a sweep center) expressed by antenna direction θ referenced to own ship's heading and time t elapsed after each successive transmission, for instance. The address map generated by the display address generator 10*b* is used for mapping pixel data output from the radar echo signal processor 10*a* to individual addresses of the display memory 10*c*.

The aforementioned coordinate conversion is accomplished by hardware which performs mathematical operation expressed by the following equations:

$$X = Xs + r\theta$$

$$Y = Ys + r\theta$$

where X, Y: addresses of display memory
Xs, Ys: address of sweep center
r: distance from sweep center
t: time elapsed after transmission
θ: angular direction of antenna The display memory 10*c* is a memory having a capacity to store the echo data received during one rotation of the antenna 6. The display memory 10*c* writes and stores the pixel data sequentially output from the radar echo signal processor 10*a* in the addresses specified by the address map generated by the display address generator 10*b* and outputs the stored pixel data in synchronism with display operation, whereby the display echo data for on-screen presentation on each currently selected range scale is generated.

The ARPA processor 11 produces uniquely defined motion-related information on each tracked target to be superimposed on the display echo data by using echo signals obtained with the different pulselengths. To be more specific, the ARPA processor 11 generates plural sets of motion-related information on each tracked target from the echo signals obtained with the individual transmission pulselengths and selectively combines pieces of the motion-related information thus generated according to the distance from own ship position to produce the uniquely defined motion-related information on each tracked target to be superimposed on the display echo data. Operational parameters used in the ARPA processor 11 are supplied from the operational parameter register 2.

Figure 2B:
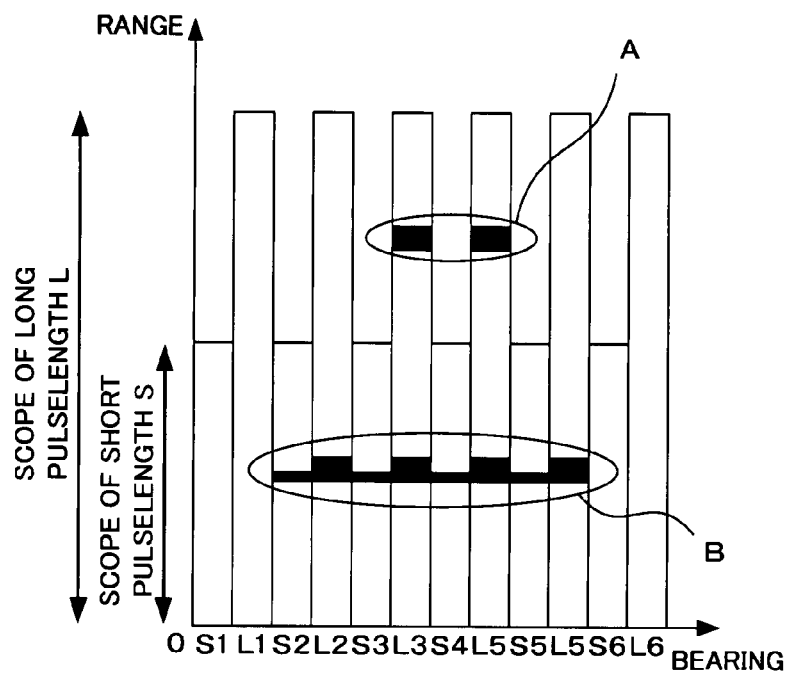

FIGS. 2A and 2B are diagrams depicting echo signals input into the ARPA processor 11 of the radar apparatus of the first embodiment, FIG. 2A showing detection areas on two range scales in use and FIG. 2B schematically showing echo signals input into an internal memory of an echo detector block 21. Shown in FIGS. 2A and 2B is an example in which the radar apparatus alternately transmits pulse signals having two different pulselengths, that is, the pulse signal having a short pulselength S for short range detection and the pulse signal having a long pulselength L for long range detection.

Designated by "A" and "B" in FIG. 2A are targets being tracked, and the echo signals of these targets, which are detected as the antenna 6 rotates clockwise as indicated by an arrow in FIG. 2A, are schematically shown in FIG. 2B. FIGS. 2A and 2B also show ranges of distances in which echo data obtained with the pulse signals having the short pulselength S and the long pulselength L are sampled and stored.

Painted in black in FIG. 2B are blips representing echoes of the tracked targets A and B shown in FIG. 2A. Referring to FIG. 2B, segments S1 to S6 show the echo signal obtained with the short pulselength S for short range detection, whereas segments L1 to L6 show the echo signal obtained with the long pulselength L for long range detection. The echo of the target B shows a staggered pattern having varying thicknesses (radial dimensions) along an angular direction as indicated in segments S2 to S5 and segments L2 to L5. This is because the transmission pulselength used in segments S1 to S6 differs from that used in segments L1 to L6.

The echo data obtained in segments S1, L1, S2, L2 and upward with the pulse signals (transmit signals) alternately having the short pulselength S and the long pulselength L are successively input into the internal memory of the echo detector block 21. The ARPA processor 11 separates the successively input echo data into plural (two in this example) groups of echo data obtained with the pulse signals having the respective pulselengths. The ARPA processor 11 separately processes the echo signal obtained in segments S1 to S6 and upward with the short pulselength S and the echo signal obtained in segments L1 to L6 and upward with the long pulselength L and thereby generates two sets of motion-related information on the same tracked targets.

Processing performed by the ARPA processor 11 is now described in greater detail with reference to FIG. 3 which is a block diagram showing the configuration of the ARPA processor 11.

Figure 3:
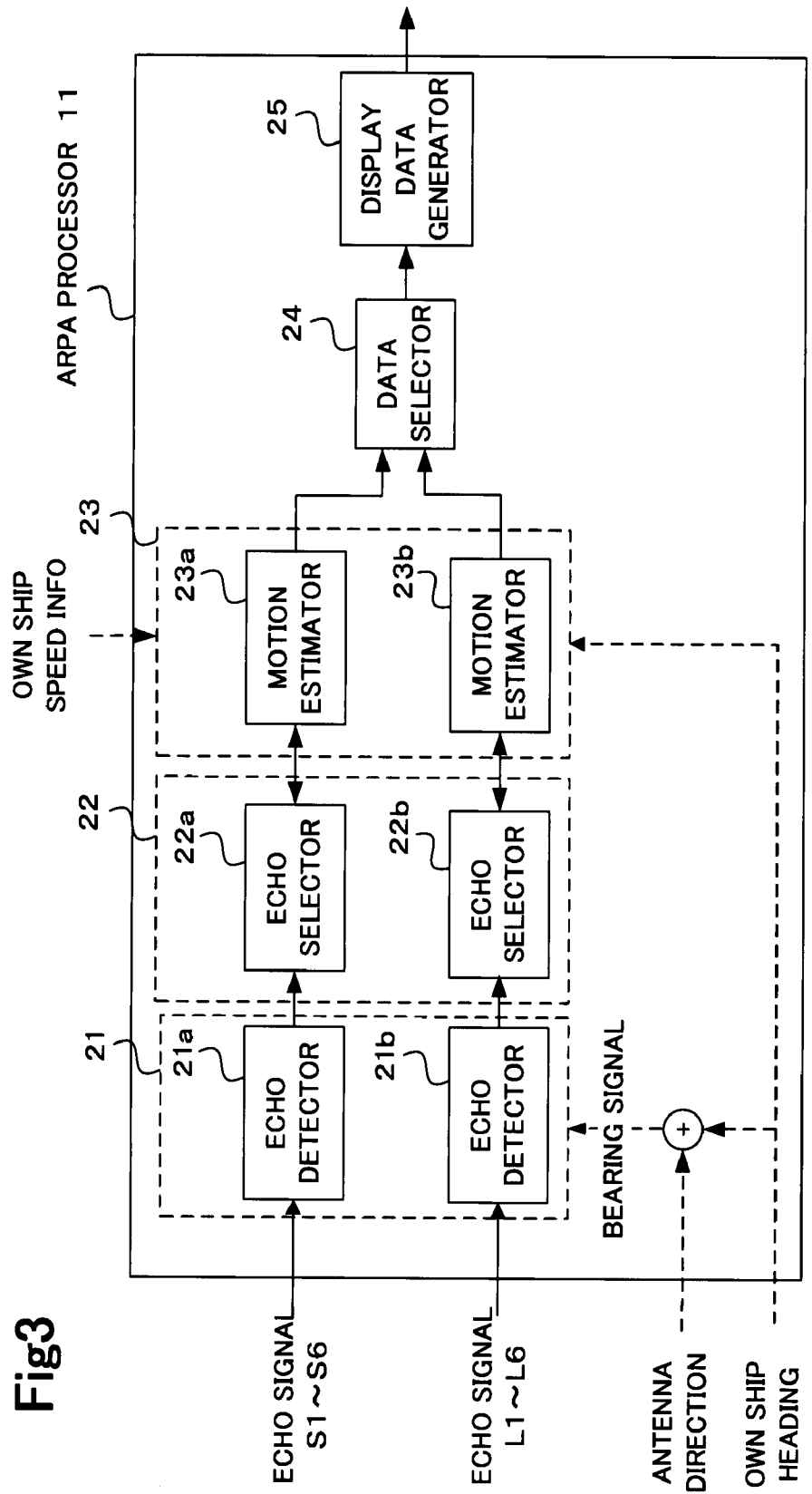
FIG. 3 is a block diagram showing the configuration of an ARPA processor of the radar apparatus of the first embodiment.

As shown in FIG. 3, the ARPA processor 11 includes, in addition to the aforementioned echo detector block 21, an echo selector block 22, a motion estimator block 23, a data selector 24 and a display data generator 25.

First, the echo data successively input from the receiving circuit 7 are separated into the echo signals obtained with the different (short and long) pulselengths and these echo signals are fed into respective echo detectors 21*a*, 21*b* of the echo detector block 21. As the radar apparatus alternately transmits the pulse signals having the two different pulselengths in this example, the echo signals (echo data) successively delivered from the receiving circuit 7 are alternately fed into the echo detectors 21*a* and 21*b*. The echo detectors 21*a*, 21*b* extract echoes which can be regarded as indicating true targets and then determine the positions of representative points of the individual echoes using a bearing signal. The bearing signal supplied to the echo detectors 21*a*, 21*b* gives information on the direction from which the echo signals are received as determined from a combination of own ship's heading and the antenna direction θ referenced to own ship's heading.

The echo selector block 22 includes echo selectors 22*a* and 22*b* which select only those echoes which indicate the targets being tracked by using outputs of the echo detectors 21*a* and 21*b*, respectively. Specifically, each of the echo selectors 22*a*, 22*b* selects only one echo which can be regarded as a true echo of each target being tracked from multiple input echoes based on an estimated position and estimated speed of the same target obtained in a preceding calculation cycle output from motion estimators 23*a* and 23*b* of the motion estimator block 23 provided in a succeeding stage and outputs the selected echo to the motion estimators 23a and 23b, respectively.

Next, the motion estimators 23a, 23b produce two sets of estimated motion-related information on the tracked target from the echo signals obtained with the two different pulselengths, the estimated motion-related information including course and speed of the tracked target as well as range and bearing of the tracked target as viewed from own ship, for instance, based on past and current positions of the target echoes selected by the echo selectors 22a, 22b. The motion estimator block 23 includes motion estimators 23a and 23b each of which calculates an estimated position of the tracked target by smoothing changes in the position of a midpoint between an estimated position of the target obtained from a preceding scan (antenna rotation) and the position of the representative point of the target echo determined by the echo detectors 21a, 21b. In this way, each of the motion estimators 23a, 23b estimates the range and bearing of the tracked target as viewed from own ship. Each of the motion estimators 23a, 23b also estimates the course of the tracked target from the last estimated position and the currently estimated position of the tracked target. Further, each of the motion estimators 23a, 23b estimates relative speed of the tracked target by dividing the distance from the last estimated position to the currently estimated position of the tracked target by a period of time required for the target to move from the former position to the latter position and then determines true speed of the tracked target by vectorically adding the relative speed of the tracked target to own ship's true speed which can be obtained from a speed log or Global Positioning System (GPS), for instance. The motion estimator block 23 uses an αβ tracker or a Kalman filter, for instance, for estimating the position and speed of the tracked target.

The motion estimators 23a, 23b output two sets of motion-related information including the estimated position and course of each tracked target to the data selector 24. The data selector 24 selects appropriate pieces of information from the two sets of motion-related information generated from the echo signals obtained with the two different pulselengths and, then, the display data generator 25 generates the motion-related information on each tracked target to be superimposed on the display echo data using an output of the data selector 24.

Figure 4A:
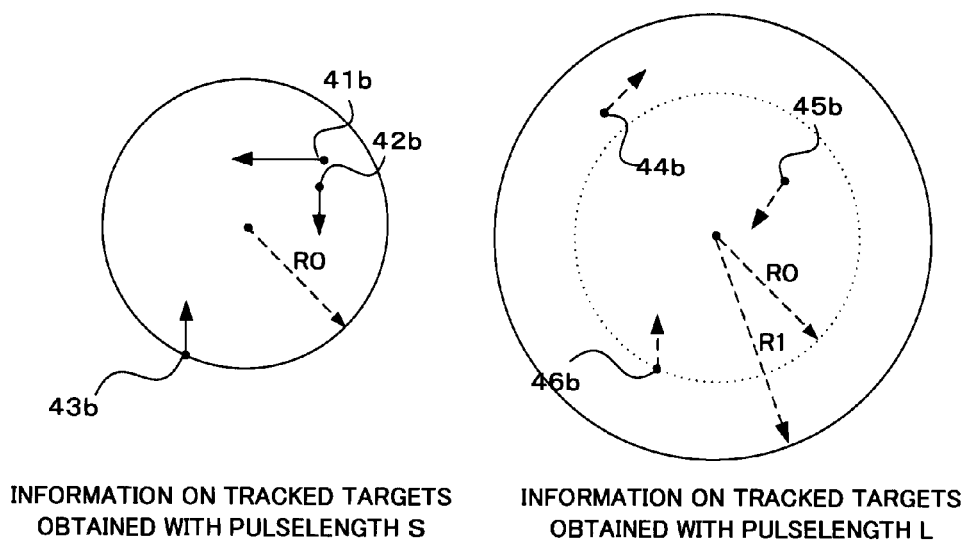
FIGS. 4A and 4B are diagrams showing how the ARPA processor of the radar apparatus of the first embodiment generates motion-related information on tracked targets.
Figure 4B:
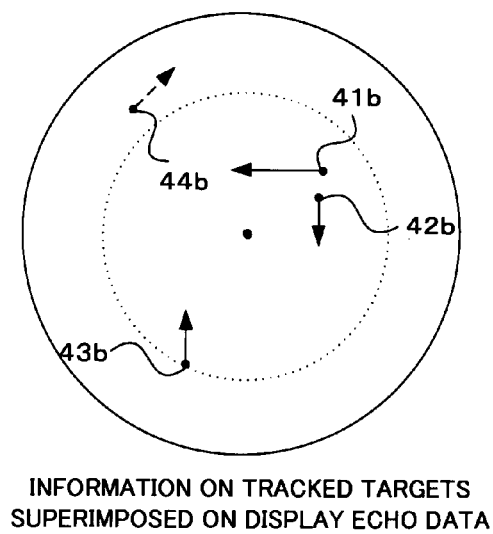

FIGS. 4A and 4B are diagrams showing how the ARPA processor 11 of the radar apparatus of the first embodiment generates the motion-related information on tracked targets, FIG. 4A showing two sets of motion-related information on the tracked targets generated from the echo signals obtained with the two different pulselengths and FIG. 4B showing an example of the motion-related information on the tracked targets to be superimposed on the display echo data. In FIGS. 4A and 4B, the motion-related information of the individual tracked targets is represented by graphic symbols (vectors) 41b to 46b.

Referring to FIGS. 4A and 4B, the data selector 24 first selects appropriate pieces of motion-related information on the tracked targets for superimposition on the display echo data from two sets of motion-related information generated by the motion estimators 23a, 23b from the echo signals obtained with the two different transmission pulselengths. Specifically, the data selector 24 generates the motion-related information on the tracked targets to be superimposed on the display echo data by selectively combining pieces of information taken from the two sets of motion-related information obtained with the two different transmission pulselengths according to the distance from own ship. In principle, the data selector 24 gives priority to such pieces of motion-related information that are derived from an echo signal obtained with a short pulselength which produces higher range discrimination for any tracked targets located close to own ship. For example, pieces of motion-related information derived from an echo signal obtained with a transmission pulselength for a shortest range scale are assigned for targets tracked in a nearby area of own ship, and pieces of motion-related information derived from echo signals obtained with transmission pulselengths for progressively longer range scales are assigned for targets tracked in distant areas according to the distance from own ship.

In the example shown in FIG. 4B, the pieces of motion-related information for on-screen presentation are selected according to distances from own ship to individual targets. Specifically, the pieces of motion-related information derived from the echo signal obtained with the short pulselength S are used for the targets tracked in a range of 0 to R0 from own ship, whereas the pieces of motion-related information derived from the echo signal obtained with the long pulselength L are used for the targets tracked in a range of R0 to R1 from own ship. A decision on which range of distances a particular target being tracked belongs is made based on which range the position of the representative point of the corresponding target echo determined by the echo detector block 21 falls in. If the position of the representative point of the target echo lies exactly on a boundary between two ranges of distances, the aforementioned decision may be made according to a predefined rule. In the example of FIG. 4B, the position of the representative point of the target echo indicated by the graphic symbol 43b lies on the boundary between the range of 0 to R0 and the range of R0 to R1, and this target echo is treated as belonging to the nearer range of 0 to R0, so that the graphic symbol 43b representing the motion-related information on this target derived from the echo signal obtained with the short pulselength S is adopted for superimposition on the display echo data.

Described below is how the ARPA processor 11 generates the motion-related information in a case where a particular target being tracked travels from one range of distances to another, passing across the boundary therebetween.

Although the echo signal used for generating the motion-related information on the tracked target may be switched when the target travels from one range of distances to another, the motion-related information on the tracked target displayed on-screen may abruptly change at the moment when the target passes across the boundary because the displayed motion-related information is derived from different source data. Thus, the ARPA processor 11 may continue to use the same echo signal as used before the tracked target passes across the boundary provided that the motion-related information on the target has been readily available before the target passes across the boundary.

Additionally, a target which returns a weak echo can be detected more easily by the long pulselength L than by the short pulselength S and, therefore, the ARPA processor 11 may select the motion-related information derived from the echo signal obtained with the long pulselength L for on-screen presentation if the target echo is judged to be too weak. The ARPA processor 11 can accomplish this by judging whether each target echo is weak or not based on echo areas and scan-to-scan rates of appearance of individual targets being tracked having different echo levels, which may be stored in the data selector 24, for example.

In the example of FIG. 4B, the ARPA processor 11 switches the motion-related information on each tracked target for on-screen presentation at the boundary between the ranges of distances of two range scales in use. In an ordinary radar apparatus, however, received echo data is sampled for a duration of time corresponding approximately to 1.5 times the selected range scale, so that it is possible to select the motion-related information derived from either the echo signal obtained with a short pulselength or the echo signal obtained with a long pulselength within a range in which the echo signal is obtained with two pulselengths. Accordingly, the ARPA processor 11 may switch from the motion-related information derived from the echo signal obtained with the short pulselength to the motion-related information derived from the echo signal obtained with the long pulselength for any tracked target moving away from own ship at a point in time when the motion-related information on that tracked target derived from the echo signal obtained with the short pulselength becomes unavailable. Alternatively, the ARPA processor 11 may determine whether to use the motion-related information derived from the echo signal obtained with the short or long pulselength for each individual tracked target, or according to echo areas and/or echo signal intensities of individual tracked targets, for instance.

The display data generator 25 converts the motion-related information on the individual tracked targets thus generated (shown in FIG. 4B) into vector information for on-screen presentation, for instance, and outputs this information to the display output synthesizer 12.

The display output synthesizer 12 superimposes the motion-related information on the tracked targets output from the ARPA processor 11 on the display echo data on each currently selected range scale output from the echo data generator 10 and, then, delivers the display echo data superimposed with the motion-related information to the display unit 13.

FIGS. 5A, 5B and 5C are diagrams showing an example of how the display output synthesizer 12 processes the display echo data and the motion-related information obtained with alternately transmitted pulse signals having two different pulselengths S, L selected on two range scales R0, R1, respectively. More particularly, FIG. 5A shows the display echo data output from the echo data generator 10, FIG. 5B shows the motion-related information on the tracked targets output from the ARPA processor 11 to be superimposed on the display echo data, and FIG. 5C shows superimposed display information delivered to the display unit 13. In this example, the motion-related information is shown in the form of velocity vectors of the individual tracked targets. In FIGS. 5A, 5B and 5C, designated by 41*a* to 46*a* are target echoes being tracked of which motion-related information is shown by the graphic symbols (vectors) 41*b* to 46*b*, respectively.

Referring to FIGS. 5A, 5b and 5c, a picture displayed on range scale R0 is obtained by directly superimposing the motion-related information derived from the echo signal obtained with the short pulselength S on the display echo data produced from the echo signal obtained with the short pulselength S. On the other hand, a picture displayed on range scale R1 is obtained by superimposing the motion-related information of FIG. 5B on the display echo data produced from the echo signal obtained with the long pulselength L. This means that the picture displayed on range scale R1 is produced by superimposing the motion-related information derived from the echo signal obtained with the short pulselength S and the motion-related information derived from the echo signal obtained with the long pulselength L on the display echo data produced from the echo signal obtained with the short pulselength L, in the range of 0 (own ship) to R0 and the range of R0 to R1, respectively.

The display unit 13 includes a display device, such as a cathode ray tube (CRT) or a liquid crystal display (LCD), for displaying image data output from the display output synthesizer 12. Shown in FIG. 5C is an example of an on-screen display. The display unit 13 may present two radar pictures on different range scales in use simultaneously on a single screen or one radar picture on one of the range scales.

The display output synthesizer 12 superimposes the same motion-related information on the tracked targets upon the display echo data on the different range scales in use in the above-described manner. Accordingly, the motion-related information on the tracked targets presented on shorter range scale R0 coincides with the motion-related information on the same tracked targets presented on longer range scale R1, for instance. Briefly, the radar apparatus of the first embodiment having the ARPA function can present the same motion-related information on the same tracked targets even when plural radar pictures are simultaneously displayed on different range scales.

Also, since the data selector 24 of the ARPA processor 11 selects such pieces of motion-related information that are derived from an echo signal obtained with a transmission pulselength for a shorter range scale for any tracked targets located close to own ship, the radar apparatus of this embodiment having the ARPA function can provide more detailed motion-related information on the tracked targets. This is particularly advantageous in avoiding presentation of incorrect motion-related information which will result from poor range discrimination on a longer range scale due to the use of a longer transmission pulselength. Specifically, even when two targets show up as a single target echo on the longer range scale like the target echo 45*a* shown in FIG. 5A, pieces of motion-related information derived from the echo signal obtained with the shorter transmission pulselength offering higher range discrimination are superimposed on that target echo as shown in FIG. 5C. This serves to clearly indicate that the target echo 45*a* actually represents two targets.

Second Embodiment

A radar apparatus having an integral ARPA function according to a second embodiment of the invention is now described with reference to FIGS. 6A, 6B and 7, in which elements like those of the first embodiment are designated by the same symbols and a description of such elements are not given below again.

The radar apparatus of the second embodiment is characterized in that an ARPA processor 11 selects one of echo signals obtained with different transmission pulselengths according to the distance from own ship position and produces motion-related information on tracked targets to be superimposed on display echo data by using the selected echo signal.

Figure 6A:
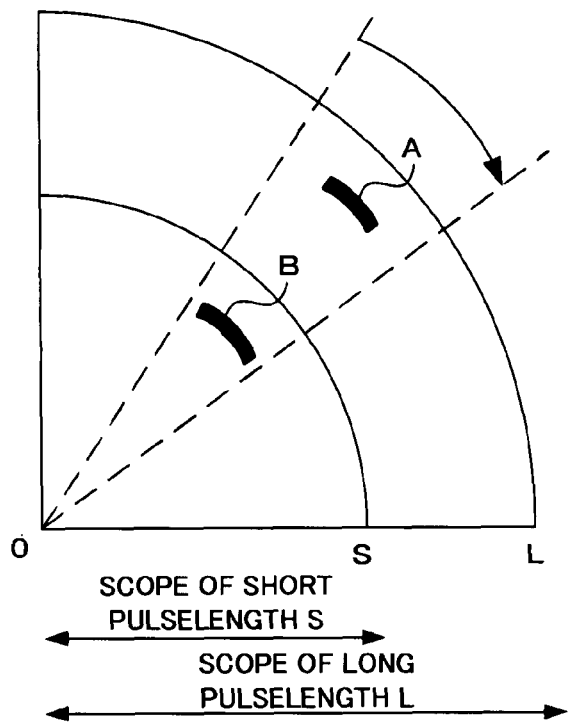
FIGS. 6A and 6B are diagrams showing how an ARPA processor of a radar apparatus according to a second embodiment of the invention works.
Figure 6B:
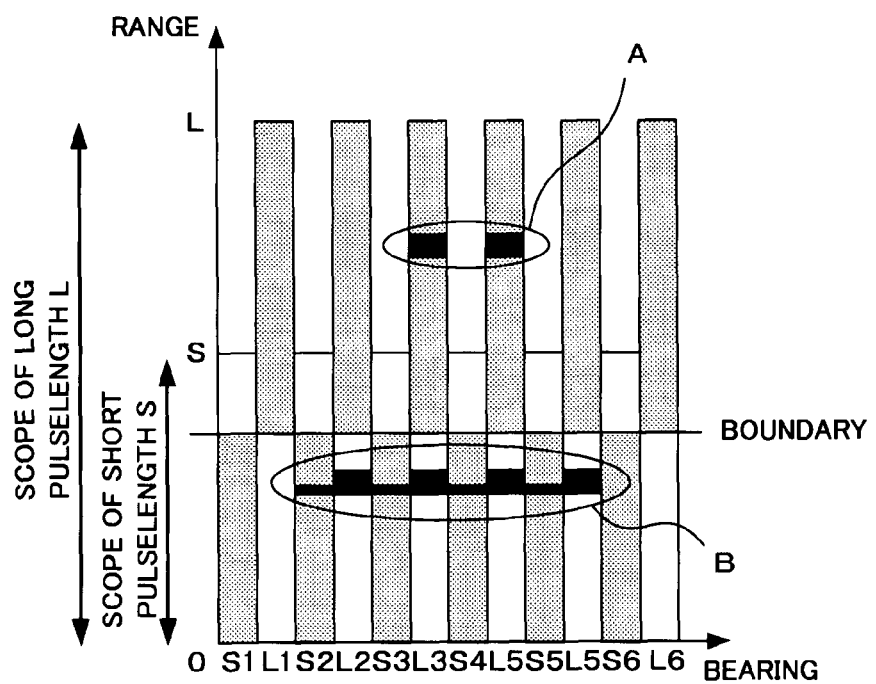
Figure 7:
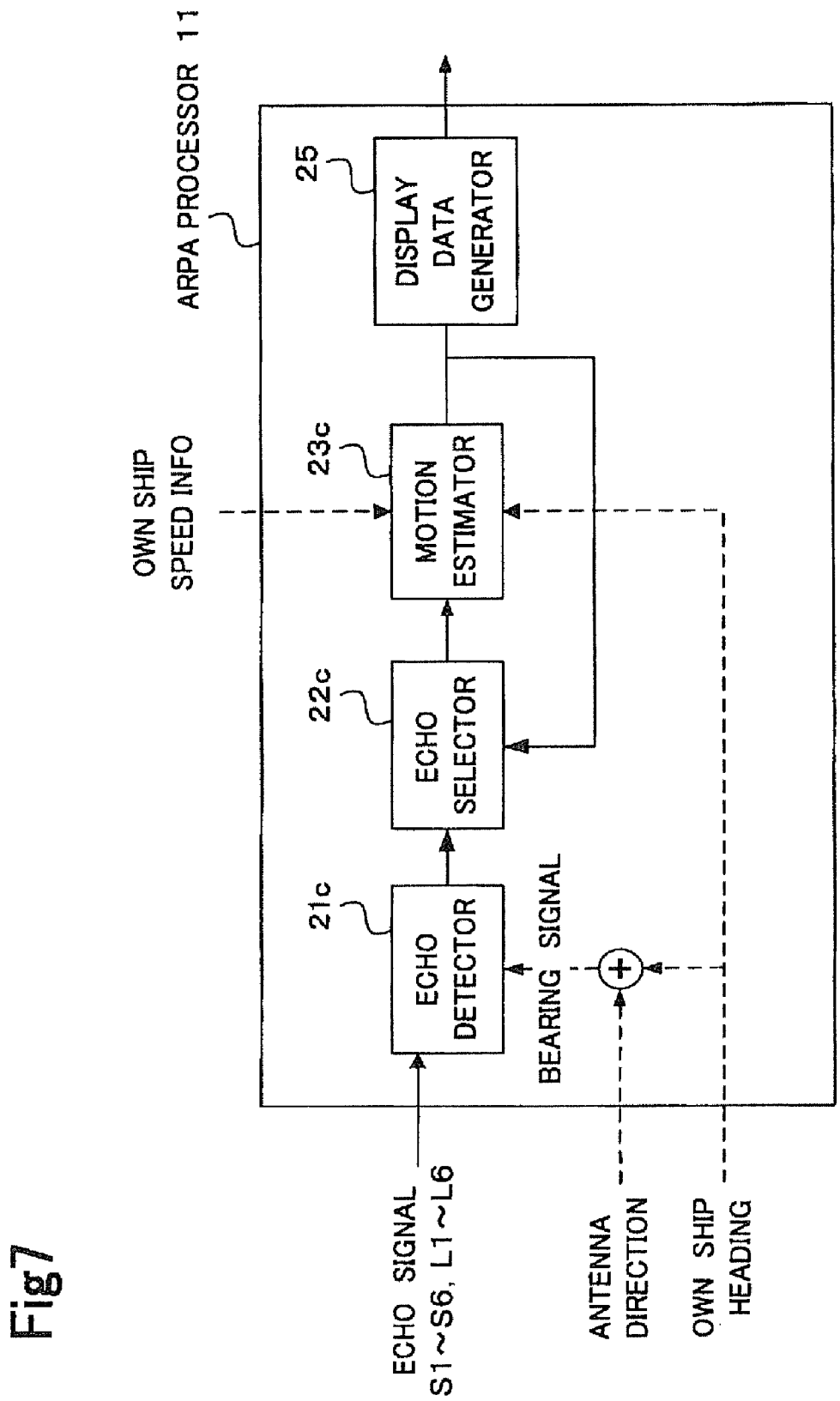
FIG. 7 is a block diagram showing the configuration of the ARPA processor of the radar apparatus of the second embodiment.

FIGS. 6A and 6B are diagrams showing how an echo detector 21*c* of the ARPA processor 11 works in the radar apparatus of the second embodiment. Shown in FIGS. 6A and 6B is an example in which the radar apparatus alternately transmits pulse signals having two different pulselengths, that is, the pulse signal having a short pulselength S for short range detection and the pulse signal having a long pulselength L for long range detection. FIG. 7 is a block diagram showing the configuration of the ARPA processor of the radar apparatus of the second embodiment.

FIG. 6A is a diagram showing detection areas on two range scales in use and FIG. 6B is a diagram schematically showing echo signals input into an internal memory of the echo detector 21*c*.

Designated by "A" and "B" in FIG. 6A are targets being tracked, and the echo signals of these targets, which are detected as the antenna 6 rotates clockwise as indicated by an arrow in FIG. 6A, are schematically shown in FIG. 6B. FIGS. 6A and 6B also show ranges of distances in which echo data obtained with the pulse signals having the short pulselength S and the long pulselength L are sampled and stored.

Painted in black in FIG. 6B are blips representing echoes of the tracked targets A and B shown in FIG. 6A. Referring to FIG. 6B, segments S1 to S6 show the echo signal obtained with the short pulselength S for short range detection, whereas segments L1 to L6 show the echo signal obtained with the long pulselength L for long range detection. The echo of the target B shows a staggered pattern having varying thicknesses (radial dimensions) along an angular direction as indicated in segments S2 to S5 and segments L2 to L5. This is because the transmission pulselength used in segments S1 to S6 differs from that used in segments L1 to L6.

The echo data obtained in segments S1, L1, S2, L2 and upward with the pulse signals (transmit signals) alternately having the short pulselength S and the long pulselength L are successively input into the internal memory of the echo detector 21c. At this point, the echo detector 21c selects one of the echo signals to be used for generating the motion-related information on each tracked target according to the distance from own ship position. Shown by shading in FIG. 6B are the selected echo signals. The echo detector 21c selects the echo signal obtained with the short pulselength S in segments S1 to S6 up to a point where the number of echo data sampled reaches a specified threshold value, whereas the echo detector 21c selects the echo signal obtained with the long pulselength L in segments L1 to L6 beyond this point where the number of sampled echo data exceeds the specified threshold value. The number of echo data sampled in each antenna direction corresponds to the distance from the own ship position. This means that the echo detector 21c selects the echo signal obtained with the short pulselength S or the long pulselength L according to the distance from the own ship position. The echo detector 21c then extracts target echoes from the selected echo signals and calculates the positions of representative points of the individual echoes. If a particular target lies astride a boundary where the echo data to be sampled is switched from one echo signal to another, the echo detector 21c may select the echo signal obtained with the short pulselength S or the long pulselength L for a consecutively appearing target echo based on in which area a specified point (e.g., a central point) of the target echo first appears, for example.

Subsequently, from the echo signal extracted by the echo detector 21c, an echo selector 22c selects a true echo of each target being tracked and a motion estimator 23c calculates an estimated position and speed of each tracked target, whereby the motion-related information on the tracked targets to be superimposed on the display echo data is generated. In the example shown in FIGS. 6A and 6B, the echo signal obtained with the short pulselength S is used in segments S2 to S5 for generating the motion-related information on target B existing in an area closer to own ship than the boundary where the echo data to be sampled is switched from one echo signal to another, whereas the echo signal obtained with the long pulselength L is used in segments L3 and L4 for generating the motion-related information on target A existing in an area outside the boundary. A single set of motion-related information is generated for each tracked target for superimposition on a corresponding radar target echo in the above-described manner by using the echo signal selected according to the distance from the own ship position.

The display output synthesizer 12 superimposes the motion-related information on the individual tracked targets generated in the aforementioned manner by the ARPA processor 11 on the display echo data on the current range scales output from the echo data generator 10, then, delivers the display echo data superimposed with the motion-related information to the display unit 13. The display unit 13 presents a picture containing the display echo data and the superimposed motion-related information in the same fashion as discussed in the first embodiment with reference to FIG. 5C.

As in the first embodiment, the display unit 13 includes a display device, such as a CRT or an LCD, for displaying image data output from the display output synthesizer 12. The picture displayed on-screen when the ARPA function is activated contains the motion-related information on the tracked targets generated by using different echo signals depending on whether the individual tracked targets exist inside and outside the boundary where the echo data to be sampled is switched from one echo signal to another.

As thus far described, the ARPA processor 11 selects one of the echo signals obtained with different transmission pulselengths according to the distance from the own ship position and produces the motion-related information on each tracked target to be superimposed on the display echo data by using the selected echo signal. Consequently, compared to the earlier-described configuration of the first embodiment in which the ARPA processor 11 generates two sets of motion-related information on the tracked targets from the echo signals obtained with the two different pulselengths, it is possible lighten work load undertaken by the ARPA processor 11 for carrying out mathematical operation in the second embodiment.

While the invention has been described with reference to the specific examples in which the radar apparatus transmits pulse signals having two different pulselengths in the foregoing first and second embodiments, the invention is also applicable a radar apparatus having an integral ARPA function which transmits pulse signals having three or more different pulselengths, yet providing the same advantages as thus far discussed.

What is claimed is:

1. A radar apparatus for transmitting at least two pulse signals, each of which has a different pulselength, and for receiving echo signals of the transmitted pulse signals, the radar apparatus comprising:

a transmitter for transmitting the pulse signals each of which is adapted to detect targets within a different predetermined range according to a specific transmission pattern;

a receiver for receiving the echo signals;

an echo data generator for generating display echo data for each of at least two range scales selected for on-screen presentation, each display echo data being generated by using an echo signal obtained with the pulse signal having a pulselength adapted to detect targets within one of the selected range scales by the receiver such that at least two display echo data are generated, each of the display echo data corresponding to a different one of the at least two pulse signals;

an ARPA processor for generating a single set of motion-related information on each tracked target to be superimposed on the at least two display echo data by using the echo signals obtained with the at least two pulse signals of different pulselengths such that the single set of motion-related information is defined by each of the echo signals used by the echo data generator for generating the display echo data;

a display output synthesizer for superimposing the motion-related information on each tracked target generated by the ARPA processor on the display echo data; and a display for displaying a superimposed picture produced by the display output synthesizer.

2. The radar apparatus according to claim 1, wherein the ARPA processor generates plural sets of motion-related information on each tracked target from the echo signals obtained with the individual pulselengths and selectively combines the plurality sets of the motion-related information according to distance from own ship position.

3. The radar apparatus according to claim 1, wherein the ARPA processor selects one of the echo signals obtained with the different pulselengths according to distance from own ship position and produces the motion-related information on each tracked target to be superimposed on the display echo data by using the selected echo signal.

4. The radar apparatus according to claim 1, wherein the ARPA processor assigns a piece of the single set of motion-related information, produced by using the echo signal obtained with a pulselength for a shorter range scale, in a nearby area of own ship and assigns another piece of said single set of motion-related information, produced by using the echo signal obtained with a pulselength for a longer range scale, in a distant area of own ship, so that the ARPA produces the motion-related information on each tracked target to be superimposed on the display echo data.

5. The radar apparatus according to claim 1, wherein the ARPA processor assigns a piece of motion-related information for each target tracked that is derived from the echo signal obtained with a pulselength for a shortest range scale within a specific range of distances from own ship.

6. The radar apparatus according to claim 1, wherein the motion-related information superimposed on the display echo data includes at least one of such information as course and speed of a tracked target, distance from own ship to the tracked target, and bearing of the tracked target as viewed from own ship.

7. A radar picture display method used by a radar apparatus that transmits at least two pulse signals, each of which has a different pulselength, and receives echo signals of the transmitted pulse signals through a single antenna, the radar picture display method comprising:

a transmitting step for transmitting the pulse signals according to a specific transmission pattern;

a receiving step for receiving the echo signals;

an echo data generating step for generating display echo data for each of at least two range scales selected for on-screen presentation, each display echo data being generated by using an echo signal obtained with the pulse signal having a pulselength adapted to detect targets within one of the selected range scales received in the receiving step such that at least two display echo data are generated each of the display echo data corresponding to a different one of the at least two pulse signals;

an ARPA processing step for generating a single set of motion-related information on each tracked target to be superimposed on the at least two display echo data by using the echo signals obtained with the at least two pulse signals of different pulselengths such that the single set of motion-related information is defined by each of the echo signals used in the echo data generating step;

a display output synthesizing step for superimposing the motion-related information on each tracked target generated in the ARPA processing step on the display echo data on each range scale; and a display step for displaying a superimposed picture produced in the display output synthesizing step.

* * * * *